W. J. MALCOLMSON AND H. L. WARD.
ROASTING APPARATUS.
APPLICATION FILED AUG. 3, 1917.
1,302,946.
Patented May 6, 1919.
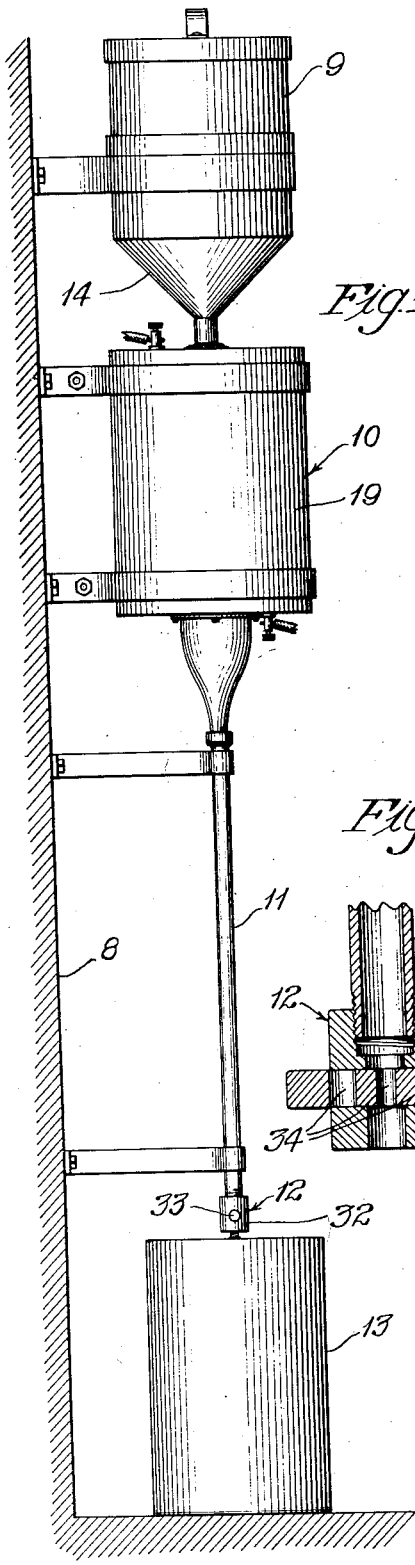
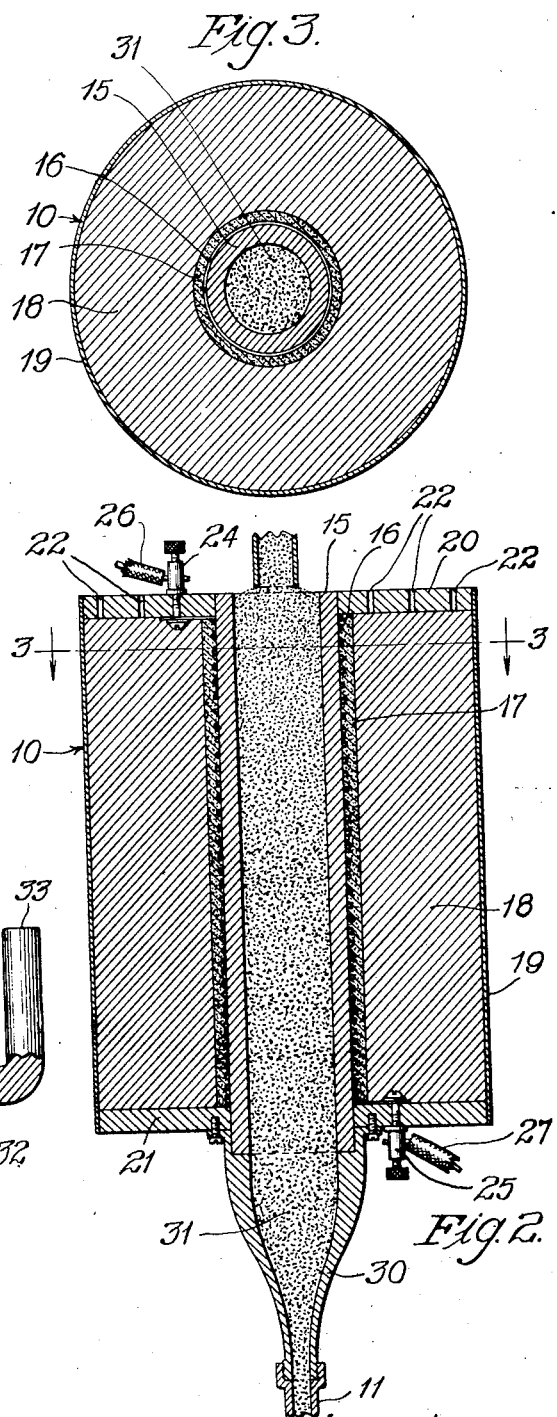
Inventors
William J. Malcolmson,
Henry L. Ward
by J. E. Roberts Atty.

UNITED STATES PATENT OFFICE.

WILLIAM J. MALCOLMSON, OF CICERO, AND HENRY L. WARD, OF CHICAGO, ILLINOIS, ASSIGNORS TO WESTERN ELECTRIC COMPANY, INCORPORATED, OF NEW YORK, N. Y., A CORPORATION OF NEW YORK.

ROASTING APPARATUS.

1,302,946.  Specification of Letters Patent.  Patented May 6, 1919.

Application filed August 3, 1917. Serial No. 184,212.

*To all whom it may concern:*

Be it known that we, WILLIAM J. MALCOLMSON and HENRY L. WARD, citizens of the United States, residing at Cicero, in the county of Cook and State of Illinois, and Chicago, in the county of Cook and State of Illinois, respectively, have invented certain new and useful Improvements in Roasting Apparatus, of which the following is a full, clear, concise, and exact description.

This invention relates to a roasting apparatus, and more particularly to an apparatus for continuously roasting granular carbon.

The art of roasting granular carbon, which is to be used with microphonic apparatus, is old and a large variety of furnaces have been devised to roast the carbon granules so as to produce a carbon of a uniform resistance. To obtain a uniform product each carbon granule or particle must be subjected to the same heat intensity for the same period of time. Likewise as the resistance of the carbon granules depends upon the temperature at which they are roasted, the resistance of the carbon decreasing with corresponding increases in the roasting temperature, the intensity of the heat must also be controlled.

This invention is directed to an improved apparatus for roasting carbon of uniform quality, the roasting process being automatic in its operation.

In the process of roasting carbon, gases are generated which form gas pockets in the granular carbon mass, which gas is either ejected up through the carbon mass when the gas pressure becomes sufficiently great, or is condensed by the untreated carbon mass, in which case caking of the granules in the mass results. Either one of these actions interferes very seriously with the uniform roasting of the carbon granules since they prevent the gradual, constant movement of the carbon granules as a single mass through the roasting chamber. This invention is characterized by an improved means for liberating the gases as they are generated in the roasting operation and this prevents the formation of gas pockets and a resultant carbon of uniform quality.

The invention is illustrated in the accompanying drawings, in which:

Figure 1 is an end elevation of the complete apparatus;

Fig. 2 is a longitudinal section through the roasting chamber;

Fig. 3 is a section on the line 3—3 of Fig. 2 looking in the direction of the arrows; and Fig. 4 is a sectional view illustrating the means for controlling the rate of flow of the carbon through the apparatus.

As illustrated in Fig. 1, the different parts of the apparatus are mounted in vertical alinement on a suitable upright such as the wall 8. The apparatus consists of the hopper 9, the roasting chamber 10, the cooling chamber 11, the regulator 12 for controlling the rate of flow of the carbon, and a suitable receiving receptacle 13. In the preferred form of the invention herein illustrated, the hopper 9 comprises a sheet metal can equipped with the funnel shaped base 14 through which the unroasted carbon in the hopper 9 is fed into the upper opening of the baking chamber 10. The baking chamber comprises a central tube 15 composed of a porous refractory material, which in its preferred form is constructed of alundum, but which may be made of any suitable porous substance capable of resisting the roasting temperature without deterioration, such as certain porous fire clays for example. The tube 15 is surrounded by a resistor 16 which is secured to the tube 15 by a suitable porous cement 17, preferably alundum cement. Surrounding and inclosing the cement 17 is a heat insulating compound 18. This heat insulating compound is inclosed by the metallic chamber 19 in which it is loosely packed so as to permit the free passage of gases therethrough. The heat insulating compound which is best suited for this purpose is known by the trade name of sil-o-cel.

Properly secured to each end of the sheet metal covering 19 are the asbestos board caps 20 and 21. The asbestos board cap 20 has provided therein suitable perforations such as 22 which permit the escape into the atmosphere of gases which find their way into the heat insulating compound 18. The resistor 17 is connected to the binding posts 24 and 25 which in turn are connected through the wires 26 and 27 to any suitable current generating source. Apparatus for controlling the current flow in the resistor 17 should be included in the circuit connecting the wires 27 and 26 to the current generating source, and it is convenient and advisable to associate with this apparatus an automatic controlling pyrometer which will permit automatic regulation of the heat generated by the resistor 16.

The axis of the alundum tube 15 is in direct alinement with the axis of the chamber 30 and the axis of the cooling chamber or tube 11. The chamber 30 is secured to the lower cap 21 of the baking chamber 10 and is so connected to the alundum tube 15 that the inner walls thereof form a continuous chamber for the passage of the carbon granules 31. The chamber 30 constitutes the connecting link between the alundum tube 15 and the cooling tube or chamber 11, and the carbon passage therein is consequently gradually tapered from the cross-sectional area of the alundum tube 15 to the cross-sectional area of the cooling tube 11. The length of the cooling tube is determined by the maximum rate at which it is desired to pass the carbon granules through the roasting apparatus. This tube must be sufficiently long to allow the granules to cool so that they will not oxidize as they are discharged from the lower end of the tube into the receiving receptacle 13 when they are passing through the apparatus at the maximum rate. To expedite the cooling in the tube 11 the same may be conveniently equipped with radiating webs.

Attached to the lower end of the cooling tube 11 is the regulator 12 which determines the rate of flow of the carbon through the apparatus. As illustrated in detail in Fig. 4, this apparatus consists of a perforated tube 32 secured to the end of the cooling tube 11. Fitted in the perforation of the tube is a slidable member 33 equipped with holes such as 34 of varying diameter, which may be brought into alinement with the end of the cooling tube 11. The rate of flow of the carbon granules through the apparatus will depend upon the size of the opening 34 which is placed in alinement with the end of the tube 11.

In the operation of the apparatus the rate at which it is desired to permit carbon granules to flow is first determined by properly adjusting the slide 33. An untreated charge of carbon granules is then placed in the hopper 9 and then current is permitted to flow through the resistor to raise the temperature in the alundum tube 15 to the maximum desired. The carbon will now flow from the hopper 9 through the alundum tube in the baking chamber, through the chamber 30 and the cooling chamber 11 onto the receiving receptacle 13. The carbon is permitted to flow in this manner until the desired heat intensity in the alundum tube with the carbon passing therethrough is obtained. When this has been determined, by proper adjustment of the flow of current in the resistor 16, the carbon which has been collected in the receiving receptacle 13, which has been subjected to an uneven baking, is removed. All the carbon which is thereafter collected in this receptacle will have received a uniform baking and will constitute a uniform product.

As the carbon granules pass through and are roasted in the alundum tube 15 by the heat generated through the current flowing in the resistor 16, gases are constantly generated by the partial decomposition of the granular carbon. These gases in the roasting apparatus herein described pass through the porous walls of the alundum tube 15, through the porous cement 17, through the heat insulating medium 18, and then through the perforations or vent holes in the cap 20. This gas which is constantly generated in the roasting operation is consequently constantly liberated as it is formed, and therefore there is no possibility of the formation of gas pockets in the column of the granular mass of carbon which is passing through the alundum tube 15. Unless means are provided for the continuous liberation of these formed gases, gas pockets are sure to form in the carbon granular mass. These gas pockets will gradually increase in size, and the pressure exerted by the confined gas will also gradually increase. When this pressure becomes sufficiently great to overcome the weight of the mass of untreated carbon above the gas pocket, the gas will be ejected through the upper opening in the tube 15. Gas ejected in this manner will frequently throw the carbon granules out of the top of the roaster with considerable force. When a gas pocket which is formed in the granular mass collapses, due to the liberation of the gas, it will be evident that the column of the granular carbon above the gas pocket will be subjected to a sudden rapid downward movement, the extent thereof depending upon the volume displaced by the gas pocket. It will follow, therefore, that because of this accelerated movement of this part of the granular carbon column the carbon granules contained in this portion of the column will not receive the same amount of roasting as the carbon granules which pass through the roasting temperature with a gradual, constant movement not subjected to such sudden acceleration. Obviously, therefore, if gas pockets are allowed to form in the carbon mass, the granules will not all be given a like amount of roasting and consequently an unevenly roasted product will be the result. Likewise if the generated gases are condensed and form cakes in the carbon granular mass, the column of carbon granules passing through the tube will also be subjected to sudden accelerations and likewise the carbon granules roasted will present an uneven product.

For the production of uniformly roasted carbon it is absolutely necessary, therefore, that the formation of gas pockets be eliminated, and this result can be obtained to the best advantage by the liberation of the gases as they are formed. The porous construction of the roasting chamber as herein described consequently is very beneficial in the production of roasted carbon granules of like or equal resistance. The invention is especially applicable for the production of high resistance carbon which requires a comparatively low roasting temperature, which temperature should be maintained in the neighborhood of 2000 degrees Fahrenheit. Such a temperature, which is not subject to a substantial variation, can be readily maintained by the use of a heating resistor 16 such as is wound or wrapped about the alundum baking tube 15, since the current flowing in said resistor may be readily regulated to give any temperature desired. Constant temperatures of this value cannot be maintained in the old process of heating the carbon granules by passing through the body of the granular material itself an electrical current of definite value.

Obviously the invention is not limited to the specific embodiment herein illustrated and described, but is capable of many variations without departing from its spirit and scope.

What is claimed is:

1. In an oven for roasting carbon granules, a roasting chamber adapted to permit the escape of gases therefrom, and means for regulating the gravitational flow of carbon granules through said roasting chamber to a continuous uniform movement.

2. In an oven for roasting carbon granules, a roasting chamber having a porous wall to permit the escape of gases therethrough, and means for regulating the gravitational flow of carbon granules through said chamber to a continuous uniform movement.

3. In an oven for roasting carbon granules, a vertically mounted roasting chamber through which carbon granules are adapted to flow, said chamber being adapted to permit the escape of gases laterally through its walls, and means for regulating the flow of granules through said chamber to a continuous uniform movement.

4. An oven for roasting carbon granules, comprising a roasting chamber having a porous wall through which gases generated in said chamber may escape, an electrical heating element surrounding said chamber, an insulating body of porous material surrounding said chamber and in which said heating element is embedded, and means to regulate the flow of carbon granules through said chamber to a continuous uniform movement.

5. In a device for roasting granular carbon, the combination with a hopper, of a roasting chamber comprising a porous wall, a heating means surrounding said chamber, a porous cement adapted to secure said heating means to said chamber, a heat insulating means inclosing said heating means, a cooling chamber communicating with said baking chamber, and means to regulate the gravitational flow of said carbon granules from said hopper through said baking and cooling chambers.

6. In a device for roasting granular carbon, the combination with a hopper, of an alundum roasting chamber, a heating means surrounding said chamber, an alundum cement adapted to secure said means to said chamber, a heat insulating means inclosing said heating means and loosely packed thereabout whereby gases generated in the roasting operation will be liberated through the alundum roasting chamber, the cement and the insulating means, a cooling chamber communicating with said roasting chamber, and means to regulate the gravitational flow of said carbon granules from said hopper through the roasting and cooling chambers.

In witness whereof, we hereunto subscribe our names this 21" day of July, A. D., 1917.

WILLIAM J. MALCOLMSON.
HENRY L. WARD.